(No Model.)
W. W. BEACH.
BLINDER FOR BRIDLES.
No. 350,716. Patented Oct. 12, 1886.
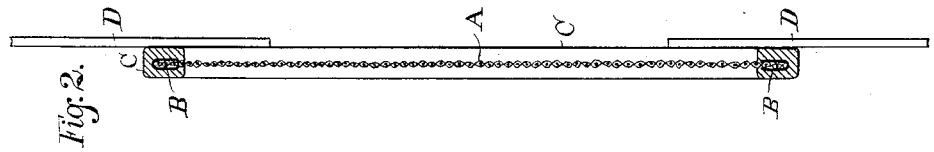
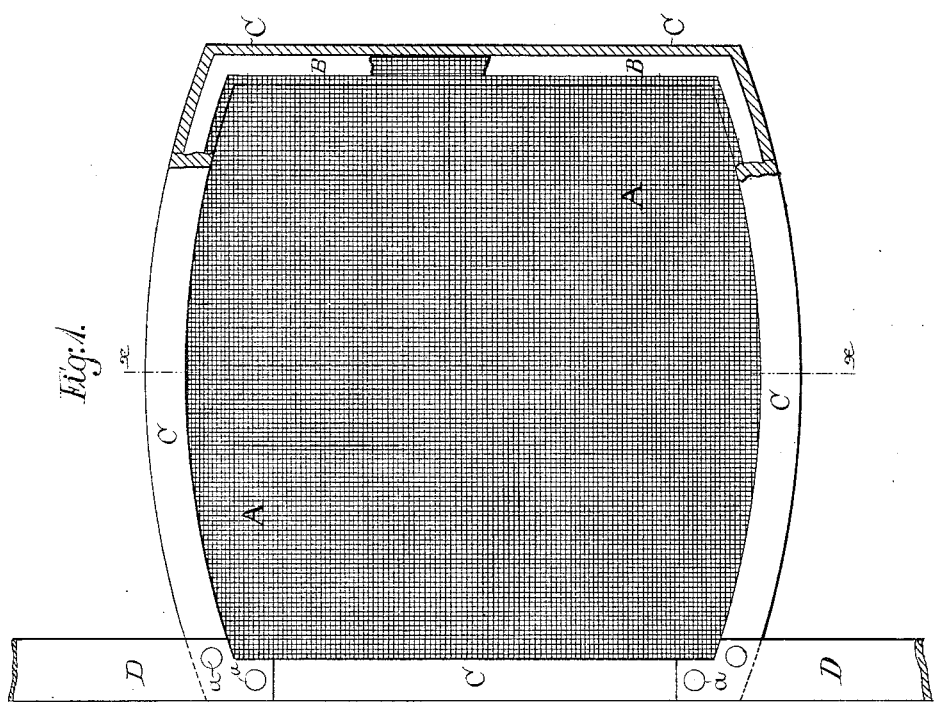
WITNESSES:
Gunvald Aas
John H. Fisher
INVENTOR
William W. Beach.
BY James A. Whitney
ATTORNEY

UNITED STATES PATENT OFFICE.

WILLIAM W. BEACH, OF NEW YORK, N. Y., ASSIGNOR TO DAVID R. MORSE, OF BROOKLYN, NEW YORK, AND RANDOLPH M. STELLE, OF PLAINFIELD, NEW JERSEY.

BLINDER FOR BRIDLES.

SPECIFICATION forming part of Letters Patent No. 350,716, dated October 12, 1886.

Application filed June 27, 1884. Serial No. 136,177. (No model.)

*To all whom it may concern:*

Be it known that I, WILLIAM W. BEACH, of the city, county, and State of New York, have invented certain Improvements in Blinders or Winkers for Headstalls, Bridles, &c., of which the following is a specification.

My invention consists in a particular construction of a foraminated blinder, such as explained, which I will first proceed to describe, and subsequently point out in the claim its novel characteristics.

Figure 1 is a side view and partial sectional view of the blinder or winker made according to my said invention, and Fig. 2 is a transverse sectional view taken in the line $x\ x$ of Fig. 1.

A is a piece or sheet of foraminated material, preferably of wire-cloth, which may be of any desired mesh or character. In place of wire-cloth and as an equivalent thereof, perforated sheet metal may be used. It is intended that the foraminated material, whether of wire-cloth or perforated sheet metal, shall be of such character that currents of air may pass readily through the same and carry therewith particles of dust or grit that may be borne upon or with the said air-currents.

B is a rim of sheet metal extended around the circumference of the piece or sheet A, and folded over the circumferential edge thereof, as indicated more fully in Fig. 2. This rim of sheet metal may be applied either by simple manipulation or by suitable dies, or by any other appropriate means, the said rim being folded upon and around the circumferential portions of the piece or sheet A, as aforesaid, and compressed upon the said circumferential portions with sufficient snugness and firmness to insure its retention in place, said sheet-metal rim constituting a secure frame around the circumference of the piece or sheet A, and giving it very great strength, rigidity, and firmness, and retaining said piece or sheet A in the requisite form.

C is the external layer, thickness, or coating of celluloid or other material capable of being applied in plastic condition and subsequently becoming harder. This plastic material is applied over the rim B, as indicated in Fig. 2, and gives greater size to the said rim and renders the same more symmetrical and pleasing in appearance, and in certain extent stronger than it would be if the framework of the blinder or winker was composed wholly of the sheet-metal rim B, and, furthermore, avoids the oxidation and corrosion which might otherwise impair or destroy the sheet-metal rim B. This plastic material may be applied in its place, as aforesaid, either by simple manipulation, or it may be compressed in place by the use of suitable dies. In place of celluloid, any other appropriate plastic material capable of application in a plastic condition, and of subsequently hardening to the requisite extent, may be employed.

The blinder or winker as thus constructed may be attached to the headstall or bridle by any suitable means—as, for example, by straps D, answering to those of the ordinary blinder or winker, and attached in place by rivets $a$ or by any other suitable means. The rim B and the outer layer or thickness, C, may be of any suitable width and diameter, and the sheet A may be of any required size or of any desired circumferential configuration.

When the foraminated material is of that variety known as "wire-gauze," the rim B is capable of more advantageous attachment than when affixed to a smooth perfectly-plain surface, inasmuch as the compression of the folded opposite sides of said rim upon the corresponding sides of the meshed material indents the interlaced wires into the inner surfaces of the rim to a greater or less degree, and thereby the rim more effectually grips and retains itself in place.

What I claim as my invention is—

The combination, with the foraminated piece or sheet A and its circumferential sheet-metal rim B, folded and compressed thereon, as described, of the outer layer or thickness, C, of celluloid or equivalent plastic material, all substantially as and for the purpose herein set forth.

WILLIAM W. BEACH.

Witnesses:
 GUNVALD AAS,
 JOHN H. FISHEY.